3,057,893
METHOD OF PREPARING 14-HYDROXY-CIS-11-EICOSENOIC ACID AND ESTER DERIVATIVES THEREOF
Cecil R. Smith, Jr., Peoria, Marvin O. Bagby, Morton, and Ivan A. Wolff, Peoria, Ill., assignors to the United States of America as represented by the Secretary of Agriculture
No Drawing. Filed Jan. 10, 1961, Ser. No. 81,907
6 Claims. (Cl. 260—410.9)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention pertains to novel and useful derivatives of the hitherto uncharacterized seed oils of the genus Lesquerella (family Cruciferae), including the species lasiocarpa and lindheimerii, the seed oils of which are present to the extent of about 30 percent.

We have discovered that the principal constituent fatty acid of the triglycerides comprising the above seed oils (to the extent of about 40–45 percent of the triglycerides of L. lasiocarpa and about 51–72 percent of the triglycerides of L. lindheimerii) is a $C_{20}$-hydroxy acid analog of ricinoleic acid. Specifically, this novel fatty acid is 14-hydroxy-cis-11-eicosenoic acid which we will designate as lesquerolic acid, having the structure

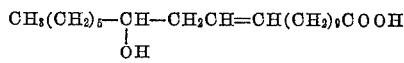

Lesquerolic acid as well as its alkyl esters and alkaline pyrolysis cleavage products such as dodecanedioic acid and octanol-2 have commercial value as useful intermediates for the synthesis of coatings, resins, plasticizers, etc.

Accordingly, the principal object of this invention is the production of useful chemical intermediates from easily cultivatable agricultural sources, the acreage of which could profitably be greatly expanded in partial substitution for certain surplus crops. A more specific object is a novel method of preparing a $C_{12}$ dibasic acid, namely dodecanedioic acid, and the secondary alcohol, octanol-2. Other objects will be apparent to one skilled in the art.

The preparation of the novel products of our invention is shown in the following examples.

*Example 1*

Coarsely ground seeds of Lesquerella lasiocarpa (431.9 g.) were Soxhlet-extracted overnight with petroleum ether. Then most of the solvent was evaporated under nitrogen on a steam bath and the balance evaporated in vacuo, yielding 113.2 g. of an oily material which we then transesterified by refluxing for 2 hours under nitrogen in 3200 ml. of methanol containing 1 percent sulfuric acid. The mixed methyl esters were isolated from the solution by diluting with 5 liters of water, saturating with sodium chloride, successively extracting with ether, extracting the pooled ether extracts with 5 percent potassium carbonate, successively washing the pooled ether extract with water, separating the ether layer and drying the same over sodium sulfate, and removing the ether under partial vacuum to give 111.5 g. of mixed methyl esters. Partial distillation of 110.4 g. of the mixed methyl esters in a spinning band column left 54.5 g. of a concentrate in the still pot that by gas chromatography was found to consist of 4 percent methyl hydroxyoctadecenoate, 2 percent of the methyl ester of a $C_{20}$ unsaturated acid, 1.1 percent of the methyl ester of a $C_{20}$ saturated acid, and 92.9 percent of methyl lesquerolate. The above concentrate (54.47 g.) was then refluxed under nitrogen for 2 hours with 655 ml. of N. ethanolic-potassium hydroxide, concentrated under partial vacuum to about 200 ml., diluted with 1200 ml. of water, successively extracted with 200 ml. portions of ether, and the combined ethereal extracts then successively washed with 100 ml. portions of water. The combined aqueous alkaline mixture and wash water were acidified to methyl orange with hydrochloric acid and extracted with successive portions of ether. The pooled ethereal extract was washed with water, and then made slightly alkaline to indicator paper with ethanolic sodium hydroxide to form the sodium soaps. Upon removal of the solvent under reduced pressure, 52.9 g. of the mixed sodium soaps were obtained.

From another preparation of the mixed methyl esters a 3.40 g. portion was subjected to a 30-transfer countercurrent distribution with acetonitrile-hexane. Methyl lesquerolate recovered from tubes 6–14 was found by gas chromatography to be 90 to 97 percent pure. Methyl lesquerolate shows IR maxima at $2.740\mu$; $2.770\mu$ (doublet); and at $5.720\mu$ (no maximum at $10–11\mu$).

*Example 2*

A 1.11-g. portion of the highly purified methyl lesquerolate of Example 1 was refluxed for 1 hour with 0.8 N ethanolic potassium hydroxide to form the corresponding potassium soap. Water was added and the unsaponifiables were removed by extracting with ether. The aqueous solution remaining was acidified strongly with hydrochloric acid to free the lesquerolic acid which was then extracted with successive portions of ether. After pooling and drying the ether extracts over sodium sulfate, the ether was evaporated to give 0.90 g. of pure lesquerolic acid, an oily material having a rotation of $[\alpha]_D^{22} +6\pm1°$.

*Example 3*

A reaction chamber containing a thermometer and an inlet tube for introducing superheated steam and having a partial reflux condenser attached to a water condenser was charged with 6.0 g. sodium hydroxide (about 250 percent excess), 15 g. of sodium lesquerolate, and 1 ml. of water. After externally heating the reactants to 200° C., superheated steam was admitted to provide temperatures between 255–350° C. (mostly 270–300° C.) during 5 hours. The undistilled residue was dissolved in 400 ml. of water, heated to 80–90° C., faintly acidified, and the oily scum removed. The hot solution was then acidified to about pH 2, and the solution was cooled, whereupon a white precipitate comprising dodecanedioic acid formed. The precipitate was dissolved by heating with 400 ml. ethanol containing 0.4 g. activated carbon. The solution was filtered, concentrated to about 300 ml., diluted with 400 ml. water, and cooled to 7° C. Crude dodecanedioic acid 2.92 g. (31.9 percent of theory) was obtained. After extracting the crude dibasic acid with successive portions of petroleum ether, 2.18 g. (23.8 percent of theory) of partially purified dodecanedioic acid (M.P. 120–126° C.) and having a neutral equivalent of 122.3 was obtained. By gas chromatography the partially purified acid was found to comprise dodecanedioic acid 89.9 percent, sebacic acid 0.7 percent, tetradecanedioic acid 6.3 percent, and unidentified acids 3.2 percent.

Meanwhile, the volatilized octanol-2 comprising the condensate from the pyrolysis reaction was isolated by saturating the condensate with sodium chloride, extracting the saturated solution with successive portions of ether, washing the combined ether extract, drying it over sodium sulfate, and distilling off the ether to provide crude octanol-2 (2.02 g., 39.0 percent of theory). Upon redistillation 0.94 g. (18.1 percent of theory) of octanol-2 (B.P. 165°–185° C.) was obtained. After adducting carbonyl compounds present with sodium bisulfite, we recovered 0.85 g. (16.4 percent of theory) of pure octanol-2. The pyrolysis reaction is indicated below.

CH₃(CH₂)₅CHOHCH₂CH:CH(CH₂)₉COONa + NaOH + H₂O ⟶ (Alk. pyrolysis)

(Sodium lesquerolate)

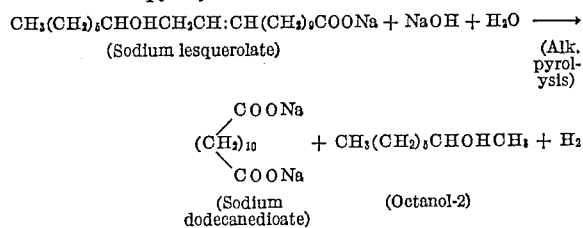

(Sodium dodecanedioate)     (Octanol-2)

Having disclosed our invention, we claim:

1. A method of preparing a lower alkyl ester of 14-hydroxy-cis-11-eicosenoic acid from glyceride-containing seeds of the genus Lesquerella comprising extracting said seeds with a solvent for the glycerides, removing the solvent, reacting the glycerides with a lower alkanol in the presence of an acidic esterification catalyst to form a mixture of the alkanol esters of the constituent fatty acids including that of 14-hydroxy-cis-11-eicosenoic acid, and separating the alkyl ester of 14-hydroxy-cis-11-eicosenoic acid from the mixture.

2. The method of claim 1 wherein the solvent for the glyceride is petroleum ether.

3. The method of claim 1 wherein the separation of the alkyl ester of 14-hydroxy-cis-11-eicosenoic acid from the esters of the other constituent fatty acids is by countercurrent distribution in an acetonitrile-hexane system.

4. The method of claim 1 wherein the separating of the alkyl ester of 14-hydroxy-cis-11-eicosenoic acid from the esters of the other constituent fatty acids is by distillation.

5. The method of claim 1 wherein the solvent for the glycerides is petroleum ether, the lower alkanol is methanol, the esterification catalyst is sulfuric acid, and the separation of the lower alkyl ester of 14-hydroxy-cis-11-eicosenoic acid from the corresponding esters of other constituent fatty acids is effected by countercurrent distribution in an acetonitrile-hexane system.

6. Method of obtaining 14-hydroxy-cis-11-eicosenoic acid, said method comprising the steps of refluxing an alkyl ester of 14-hydroxy-cis-11-eicosenoic acid with ethanolic potassium hydroxide, adding water, extracting the unsaponifiables with ether, strongly acidifying the aqueous phase to free the 14-hydroxy-cis-11-eicosenoic acid from its soap, extracting the said acid with ether, and evaporating the ether to obtain pure 14-hydroxy-cis-11-eicosenoic acid.

References Cited in the file of this patent

UNITED STATES PATENTS

| | | |
|---|---|---|
| 2,200,391 | Freeman | May 14, 1940 |
| 2,727,049 | Braconier | Dec. 13, 1955 |
| 2,777,865 | Logan | Jan. 15, 1957 |
| 2,802,845 | Sadler | Aug. 13, 1957 |
| 2,807,633 | Wetroff et al. | Sept. 24, 1957 |